(12) United States Patent
Berg

(10) Patent No.: US 10,756,798 B2
(45) Date of Patent: Aug. 25, 2020

(54) METHOD AND TRANSMITTER FOR TRANSMIT BEAMFORMING IN A WIRELESS COMMUNICATION SYSTEM

(71) Applicant: Telefonaktiebolaget LM Ericsson (publ), Stockholm (SE)

(72) Inventor: Håkan Berg, Harestad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/316,711

(22) PCT Filed: Aug. 4, 2016

(86) PCT No.: PCT/EP2016/068614
§ 371 (c)(1),
(2) Date: Jan. 10, 2019

(87) PCT Pub. No.: WO2018/024333
PCT Pub. Date: Feb. 8, 2018

(65) Prior Publication Data
US 2019/0245598 A1 Aug. 8, 2019

(51) Int. Cl.
*H04B 7/06* (2006.01)
*H01Q 3/30* (2006.01)
*H01Q 3/42* (2006.01)
*H04B 1/04* (2006.01)

(52) U.S. Cl.
CPC .............. *H04B 7/0617* (2013.01); *H01Q 3/30* (2013.01); *H01Q 3/42* (2013.01); *H04B 1/0475* (2013.01)

(58) Field of Classification Search
CPC ....... H04B 7/0617; H04B 1/0475; H01Q 3/42
See application file for complete search history.

(56) References Cited

U.S. PATENT DOCUMENTS

| 4,635,062 A | * | 1/1987 | Bierig | H01Q 3/36 333/103 |
| 5,751,248 A | * | 5/1998 | Thaniyavarn | H01Q 3/2676 342/368 |
| 5,870,670 A | * | 2/1999 | Ripley | H03D 7/165 455/304 |

(Continued)

FOREIGN PATENT DOCUMENTS

CN 105490691 A * 4/2016
EP 2 584 651 A1 4/2013

(Continued)

OTHER PUBLICATIONS

International Search Report and Written Opinion of the International Searching Authority, PCT/EP2016/068614, dated Mar. 29, 2017, 10 pages.

*Primary Examiner* — Berhanu Tadese
(74) *Attorney, Agent, or Firm* — Sage Patent Group

(57) ABSTRACT

The present invention describes a phased array transmitter and a method for beamforming. The phased array transmitter comprises a plurality of transmitting branches configured for up-converting an IF signal to an RF signal with a desired RF phase shift. Each transmitting branch is configured for phase shifting the IF signal with a first phase shift and the LO signal with a second phase shift such that the combined first and second phase shift is the desired RF phase shift of the transmitting branch.

18 Claims, 8 Drawing Sheets

(56) References Cited

U.S. PATENT DOCUMENTS

| | | | | |
|---|---|---|---|---|
| 5,977,911 A * | 11/1999 | Green | | H01Q 3/22 342/157 |
| 6,337,660 B1 * | 1/2002 | Esman | | H01Q 3/2676 342/375 |
| 6,411,256 B1 * | 6/2002 | Lier | | H01Q 1/288 342/375 |
| 6,668,024 B1 * | 12/2003 | Andre | | H03C 3/403 375/295 |
| 6,714,776 B1 * | 3/2004 | Birleson | | H03D 3/009 455/302 |
| 7,084,811 B1 * | 8/2006 | Yap | | H01Q 3/2676 342/373 |
| 7,352,325 B1 * | 4/2008 | Floyd | | H01Q 3/30 342/372 |
| 7,515,651 B1 * | 4/2009 | Haddadin | | H04L 27/36 332/103 |
| 7,519,330 B2 * | 4/2009 | Gumm | | H03M 1/007 375/346 |
| 7,623,598 B2 * | 11/2009 | Neubauer | | H04L 27/2335 375/262 |
| 7,683,833 B2 * | 3/2010 | Floyd | | H01Q 3/30 342/372 |
| 7,702,034 B1 * | 4/2010 | Haddadin | | H04L 27/362 332/103 |
| RE42,043 E * | 1/2011 | Andre | | H03C 3/403 375/298 |
| 8,195,118 B2 * | 6/2012 | Warnick | | H03D 7/168 342/354 |
| 9,172,569 B2 * | 10/2015 | Leenaerts | | H01Q 3/2682 |
| 9,184,499 B2 * | 11/2015 | Raczkowski | | H01Q 3/42 |
| 9,577,343 B2 * | 2/2017 | Park | | H01Q 15/14 |
| 9,608,675 B2 * | 3/2017 | Dorosenco | | H03F 3/245 |
| 2001/0040932 A1 * | 11/2001 | Lindquist | | H04B 15/04 375/346 |
| 2003/0162566 A1 * | 8/2003 | Shapira | | H04B 7/10 455/561 |
| 2004/0085933 A1 * | 5/2004 | Wang | | H01Q 3/42 370/334 |
| 2004/0087294 A1 * | 5/2004 | Wang | | H04B 7/0671 455/276.1 |
| 2005/0190860 A1 * | 9/2005 | Neubauer | | H04L 25/03178 375/316 |
| 2005/0197068 A1 * | 9/2005 | Gumm | | H03M 1/007 455/67.11 |
| 2007/0206958 A1 * | 9/2007 | Chen | | H01Q 3/2676 398/183 |
| 2007/0242779 A1 * | 10/2007 | Choi | | H04B 1/30 375/332 |
| 2008/0180324 A1 * | 7/2008 | Floyd | | H01Q 3/30 342/372 |
| 2010/0013527 A1 * | 1/2010 | Warnick | | H03D 7/168 327/129 |
| 2012/0049914 A1 * | 3/2012 | Pellerano | | H03L 7/1974 327/158 |
| 2013/0048880 A1 * | 2/2013 | Einziger | | H05B 6/68 250/492.1 |
| 2013/0093624 A1 * | 4/2013 | Raczkowski | | H01Q 3/42 342/368 |
| 2013/0329721 A1 * | 12/2013 | Doetsch | | H04L 27/0014 370/350 |
| 2014/0097986 A1 * | 4/2014 | Xue | | H03L 7/23 342/372 |
| 2014/0184446 A1 * | 7/2014 | Park | | H01Q 25/00 342/367 |
| 2014/0226748 A1 * | 8/2014 | Dorosenco | | H03F 3/195 375/295 |
| 2014/0241463 A1 * | 8/2014 | Leenaerts | | H01Q 3/42 375/299 |
| 2015/0333701 A1 * | 11/2015 | Kermalli | | H01P 1/397 330/107 |
| 2016/0277078 A1 * | 9/2016 | Trotta | | H04L 27/2003 |
| 2017/0257137 A1 * | 9/2017 | Matsumura | | H04B 17/14 |
| 2017/0324486 A1 * | 11/2017 | Garcia | | H04B 17/102 |
| 2019/0020109 A1 * | 1/2019 | Puleri | | H01Q 3/2676 |
| 2019/0245598 A1 * | 8/2019 | Berg | | H04B 1/0475 |
| 2019/0363744 A1 * | 11/2019 | Oshima | | H04B 7/086 |

FOREIGN PATENT DOCUMENTS

| | | | | |
|---|---|---|---|---|
| EP | | 2584651 A1 * | 4/2013 | H01Q 3/42 |
| WO | WO-2010085854 A1 * | | 8/2010 | G01S 3/023 |
| WO | WO-2011030465 A1 * | | 3/2011 | H03F 3/195 |
| WO | WO-2018024333 A1 * | | 2/2018 | H04B 1/0475 |

* cited by examiner

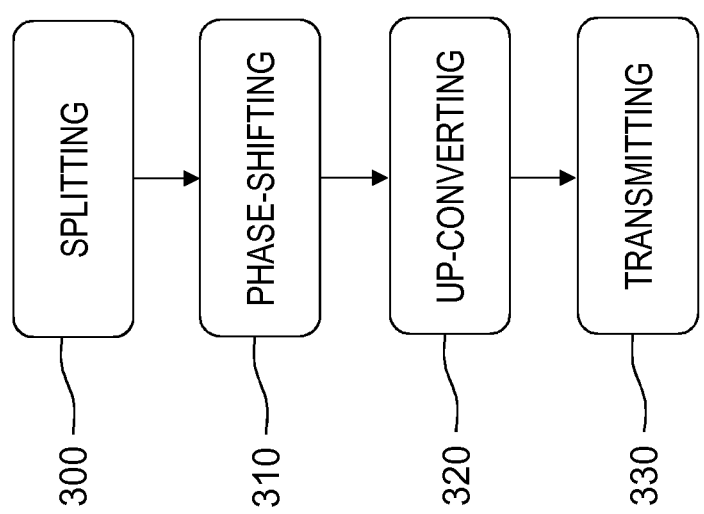

METHOD AND TRANSMITTER FOR TRANSMIT BEAMFORMING IN A WIRELESS COMMUNICATION SYSTEM

CROSS REFERENCE TO RELATED APPLICATIONS

This application is a 35 U.S.C. § 371 national stage application of PCT International Application No. PCT/EP2016/068614 filed on Aug. 4, 2016, the disclosure and content of which is incorporated by reference herein in its entirety.

TECHNICAL FIELD

Embodiments presented herein relate to a method and a phased array transmitter for transmit beamforming, and in particular, for controlling and suppressing unwanted spurious signals.

BACKGROUND

Transmit beamforming is a technique for forming directional antenna patterns in a multi-antenna system. Transmit beamforming in a phased array transmitter is accomplished by introducing phase shifts in each transmitting branch such that the output signals produce a wavefront in a certain direction.

FIG. 1A depicts a known implementation of a phased array transmitter 100. The input IF-A signal is fed to a splitter 110-A which splits the signal into a plurality of input IF signals IF-1A, IF-2A, IF-NA. The input IF signals are passed on to a plurality of transmitting branches 120-1, 120-2, 120-N, each comprising a phase shifter 121-1A, 121-2A, 121-NA for phase shifting the IF signal and a mixer 123-1, 123-2, 123-N for up-converting the phase-shifted IF signal to radio frequency, RF. In each transmitting branch, the up-converted signal RF-1, RF-2, RF-N is passed through a band-pass filter 124-1, 124-2, 124-N before being emitted from an antenna element 130-1, 130-2, 130-N.

The above implementation has the advantage of relatively simple phase shifting at an intermediate frequency (or alternatively at baseband). Moreover, a multi-channel application requires that each transmitting branch has its own up-converting mixer. A multi-channel implementation of the same phased array transmitter is shown in FIG. 1B. The multi-channel phased array transmitter 100' is identical to 100, with the addition of at least one other channel IF-B. The additional channel has a separate splitter 110-B and phase shifters 121-1B, 121-2B, 121-NB. A combiner 125-1, 125-2, 125-N combines the two phase shifted signals before the signal is up-converted to RF. The mixer 123-1, 123-2, 123-N mixes the LO and IF signals in order to provide an output RF signal.

The wanted RF output of the mixer may, for example, be RF=LO+IF, but the output will also comprise unwanted spurious signals at any frequency n*IF+m*LO where n and m are any integer not equal to one. A disadvantage of the phased array transmitters of FIGS. 1A and 1B is that the band-pass filters 124-1, 124-2, 124-N will not be able to suppress unwanted frequency components efficiently due to space constraints. Passive filtering is space consuming and becomes troublesome in high frequency applications where each channel has a specific area to use defined by the carrier frequency. For antenna arrays operating at high microwave frequencies (e.g. above 20 GHz) there is no possibility to have bulky filters behind each antenna element since these must be spaced no more than half a wavelength apart. Another problem is that for higher carrier frequencies the relative frequency difference between LO and RF frequencies decreases. This makes filter design even more troublesome when it comes to tolerances losses and even material variations. Hence, band-pass filtering alone will not be sufficient to achieve suppression of the unwanted spurious signals.

The capacity of a communication system using the phased array transmitters described above will be limited by the interference from the unwanted spurious signals, mainly LO and LO-IF. Hence, in order to increase capacity further the problem of interference from unwanted spurious signals needs to be solved. Currently there exist no efficient implementations that remedy this problem. Hence, there is a need for an improved phased array transmitter that provides suppression, or at least control, of the unwanted spurious signals.

SUMMARY

It is an object of the present invention to remedy, or at least alleviate, some of these drawbacks and to provide an efficient phased array transmitter and method for controlling the unwanted spurious signals. This is provided in a number of aspects of the present invention described below.

According to a first aspect, the invention describes a phased array transmitter comprising: a splitter configured for splitting an IF signal into a plurality of input IF signals, a plurality of transmitting branches each configured for up-converting an input IF signal to an RF signal with a desired phase shift, and each transmitting branch connected to an antenna element configured for transmitting the RF signal. The phased array transmitter is characterized in that each transmitting branch comprises an IF phase shifter configured for phase shifting the input IF signal with an IF phase shift to obtain a phase shifted IF signal. The phased array transmitter is further characterized in that each transmitting branch comprises an LO phase shifter configured for phase shifting the LO signal with an LO phase shift to obtain a phase shifted LO signal. The phased array transmitter further comprises a mixer configured for mixing the phase shifted IF signal with the phased shifted LO signal to obtain the RF signal, and wherein the combined IF phase shift and LO phase shift is the desired RF phase shift of each transmitting branch.

According to a second aspect, the invention describes a method for beamforming in a phased array transmitter. The method comprising the steps of: splitting an IF signal into a plurality of input IF signals and feeding each of the plurality of input IF signals to a corresponding transmitting branch, phase-shifting and up-converting, for each transmitting branch, the input IF signal to an RF signal with a desired RF phase shift, and transmitting, for each transmitting branch, the RF signal by feeding the RF signal to an antenna element. The method is characterized in that the step of phase-shifting, for each transmitting branch, comprises phase-shifting the input IF signal with an IF phase shift to obtain a phase shifted IF signal, and phase-shifting the LO signal with an LO phase shift to obtain a phase shifted LO signal. The choice of the IF phase shift and the LO phase shift is here determined such that the combined IF and LO phase shift is the desired RF phase shift of each transmitting branch. The method is further characterized in that the step of up-converting, for each transmitting branch, comprises mixing the phase shifted IF signal and the phased shifted LO signal to obtain the RF signal with the desired RF phase shift.

In the above phased array transmitter and method, the individual choice of IF and LO phase shifts does not affect the wanted RF signal, but it alters the unwanted spurious signals. Hence, the above phased array transmitter and method have the advantage of providing control, and thus also allowing suppression, of the unwanted spurious signals.

BRIEF DESCRIPTION OF THE DRAWINGS

FIG. 3 shows schematically a flowchart of a method for beamforming in a phased array transmitter according to a third and a fourth embodiment of the invention.

Figure 1A:
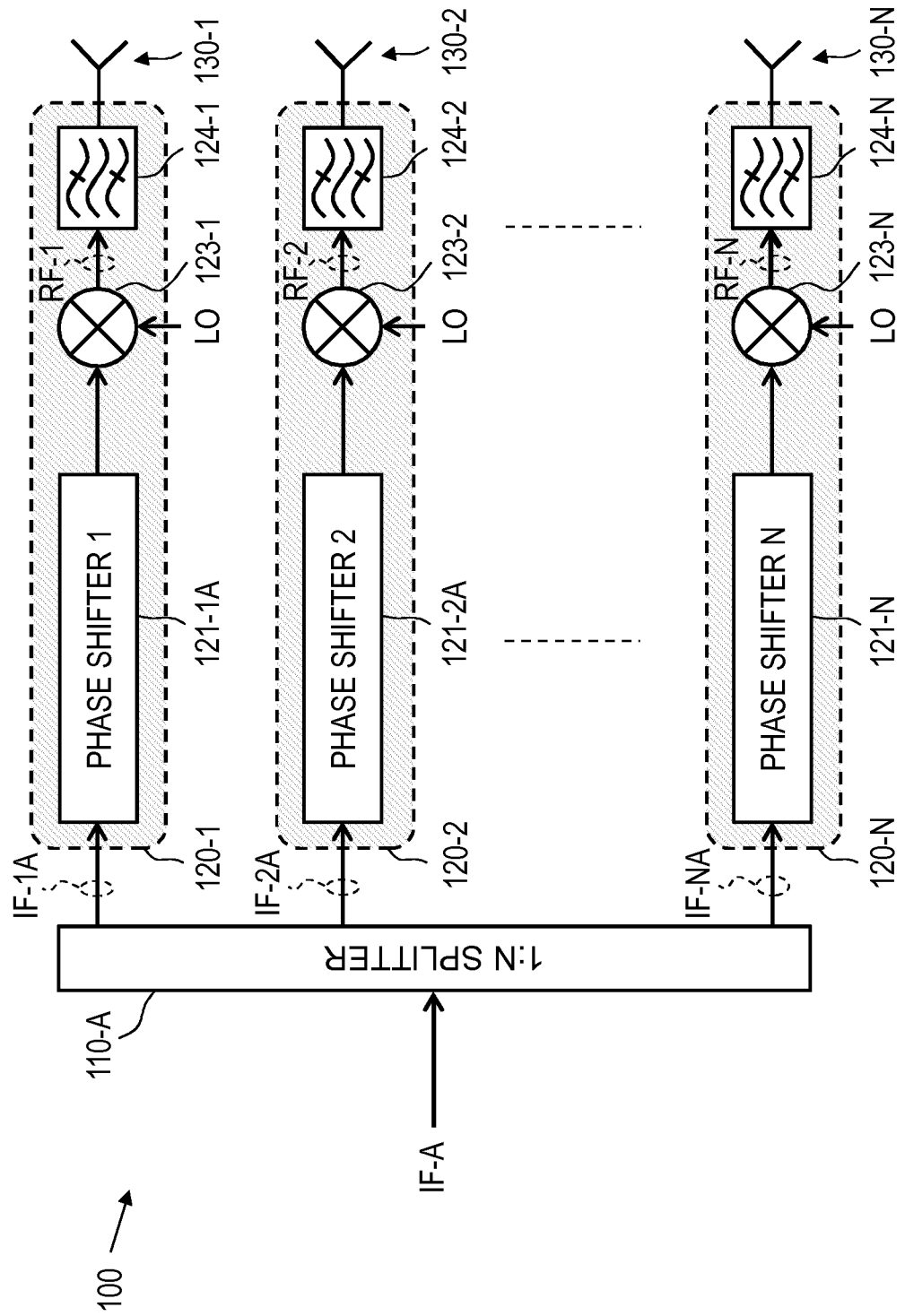
FIG. 1A shows schematically a conventional phased array transmitter.
Figure 1B:
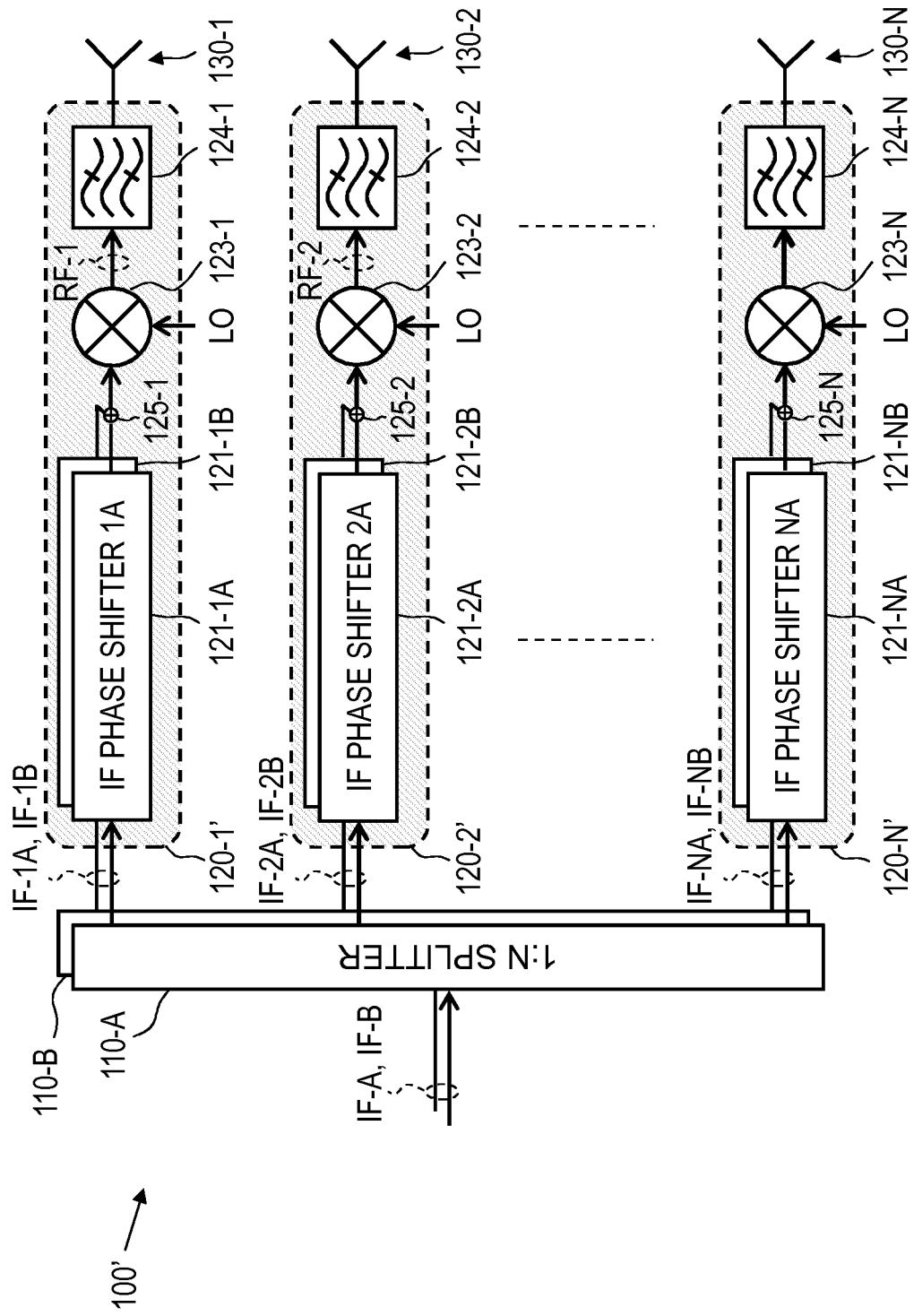
FIG. 1B shows schematically the phased array transmitter of FIG. 1A in multi-channel mode.

The drawings are not necessarily to scale and the dimensions of certain features may have been exaggerated for the sake of clarity, emphasis is instead being placed upon illustrating the principle of the embodiments herein.

DETAILED DESCRIPTION

The following abbreviations are used in the text and the drawings:
AESA Active Electronically Scanned Array
EIRP Effective Isotropic Radiated Power
IF Intermediate Frequency
LO Local Oscillator
LSB Lower Side-Band
RF Radio Frequency
USB Upper Side-Band Four embodiments of the present invention are described in detail below with reference to FIGS. 2-6. A first and a second embodiment of the invention relate to a phased array transmitter and a third and fourth embodiment of the invention relate to a method for beamforming in a phased array transmitter. It should be noted that the scope of the present invention is not limited to the particular embodiments described herein, but only limited by the appended claims.

In the following, features of the first embodiment are described with reference to FIGS. 2A and 4-6.

The first embodiment relates to a phased array transmitter 200 for beamforming that is configured for controlling and/or suppressing unwanted spurious signals. The phased array transmitter 200 comprises an IF splitter 210-A, a plurality of transmitting branches 220-1, 220-2, 220-N, and a plurality of antenna elements 230-1, 230-2, 230-N.

The IF splitter 210-A is configured for splitting an IF signal IF-A into a plurality of equal input IF signals IF-1A, IF-2A, IF-NA. If the IF signal is still in digital domain, this can be done by simply replicating the input to the plurality of outputs. If the IF signal has already been converted to analog domain, the IF splitter may be realized by a power divider that splits the incoming IF-A signal into N equal phase output IF signals. The power divider may, in turn, be realized by a network of two-way power dividers in which the two outputs of one power divider is input to two other two-way power dividers. The outputs of the IF splitter 210-A are fed to a plurality of transmitting branches 220-1, 220-2, 220-N.

The transmitting branches 220-1, 220-2, 220-N are each configured for up-converting one incoming input IF signal IF-1A, IF-2A, IF-NA to an RF signal RF-1, RF-2, RF-N with a desired RF phase shift $\varphi_{RF-1A}$, $\varphi_{RF-2A}$, $\varphi_{RF-NA}$. The desired phase shift of each transmitting branch is determined such that the phased array provides constructive interference for the RF signal in a desired spatial direction. Here the desired phase shift $\varphi_{RF-1A}$ is the phase shift of the first transmitting branch, $\varphi_{RF-2A}$ is the phase shift of the second transmitting branch, and so on. In order to achieve up-conversion to RF, each of the transmitting branches comprises a mixer 223-1, 223-2, 223-N configured for mixing the IF signal with an LO signal to provide the RF signal as output. The output of the mixer is also going to comprise unwanted spurious signals. For example, if the wanted RF signal is LO+IF, the output of the mixer is going to comprise spurious signals at any frequency n*IF+m*LO where n and m are any integers not equal to one. The spurious signals of largest concern will be LO and LSB=LO-IF, where LSB is short for lower sideband. If, on the other hand, the wanted RF signal is LO-IF, the spurious signals of largest concern will be LO and USB=LO+IF, where USB is short for upper side-band. Higher order harmonics are usually weaker and are thus of less concern. It should however be noted that the invention works for any desired RF frequency n*IF+m*LO where n and m are integers not equal to zero.

Each transmitting branch comprises an IF phase shifter 221-1A, 221-2A, 221-NA configured for phase shifting the input IF signal IF-1A, IF-2A, IF-2N with an IF phase shift $\varphi_{IF-1A}$, $\varphi_{IF-2A}$, $\varphi_{IF-NA}$ to obtain a phase shifted IF signal IF-1', IF-2', IF-N'. Preferably, the IF phase shifter provides a continuously variable phase shift. Alternatively, the IF phase shifter may provide a discrete set of phase shifts. Each transmitting branch is also comprising an LO phase shifter 222-1, 222-2, 222-N configured for phase shifting the LO signal with an LO phase shift $\varphi_{LO-1}$, $\varphi_{LO-2}$, $\varphi_{LO-N}$ to obtain a phase shifted LO signal. The LO phase shifter preferably provides a continuously variable phase shift. The LO phase shifter may alternatively provide a discrete set of phase shifts or a single fixed phase shift. Note that at least one of the IF phase shifter and the LO phase shifter in each transmitting branch must be tunable.

The choice of IF phase shift $\varphi_{IF-1}$, $\varphi_{IF-2}$, $\varphi_{IF-N}$ and LO phase shift $\varphi_{LO-1}$, $\varphi_{LO-2}$, $\varphi_{LO-N}$ is determined such that the combined IF and LO phase shift is the desired RF phase shift $\varphi_{RF-1}$, $\varphi_{RF-2}$, $\varphi_{RF-N}$ for each transmitting branch. The phases of the two input signals to the mixer are added together in the same way as the frequencies are. For example, the combined IF and LO phase shift of the first transmitting branch is derived as $\varphi_{RF-1A}=\varphi_{LO-1}+\varphi_{IF-1A}$. In case the wanted RF signal is LO-IF, the combined IF and LO phase shifts will instead be $\varphi_{RF-1A}=\varphi_{LO-1}-\varphi_{IF-1A}$.

The plurality of antenna elements 230-1, 230-2, 230-N forms an antenna array. Each transmitting branch is connected to an antenna element 230-1, 230-2, 230-N configured for emitting the RF signal. The antenna elements may for example be arranged in vertical arrays, horizontal arrays or in two-dimensional arrays. Normally, adjacent antenna elements are not spaced more than half a wavelength apart.

Each transmitting branch 220-1, 220-2, 220-N of the phased array transmitter 200 may further comprise a bandpass filter 224-1, 224-2, 224-N configured for suppressing the unwanted spurious signals. Each transmitting branch may also comprise a power amplifier configured for amplifying the RF signal.

In another aspect of the first embodiment, the choice of IF phase shift $\varphi_{IF\text{-}1A}$, $\varphi_{IF\text{-}2A}$, $\varphi_{IF\text{-}NA}$ and LO phase shift $\varphi_{LO\text{-}1}$, $\varphi_{LO\text{-}2}$, $\varphi_{LO\text{-}N}$ may further be determined for controlling and/or suppressing the phase shifts of the unwanted spurious signals of each transmitting branch. This is possible because the constraints on the combined IF and LO phase shifts provides a plurality of choices for the individual IF and LO phase shifts. For example, a desired RF phase shift of 57° may be obtained from a 40° IF phase shift and 17° LO phase shift, a 55° IF phase shift and 2° LO phase shift, or any other combination that adds up to 57°. Suppression of the unwanted spurious signals can be achieved by having an omnidirectional beam pattern for the unwanted spurious signals. One way to achieve an omnidirectional beam pattern is to let either the IF phase shift or the LO phase shift be chosen randomly. Preferably, the LO phase shifts $\varphi_{LO\text{-}1}$, $\varphi_{LO\text{-}2}$, $\varphi_{LO\text{-}N}$ are chosen randomly in order to suppress unwanted spurious signals. Another way is to have a spherical wavefront for the LO beam.

Figure 4:
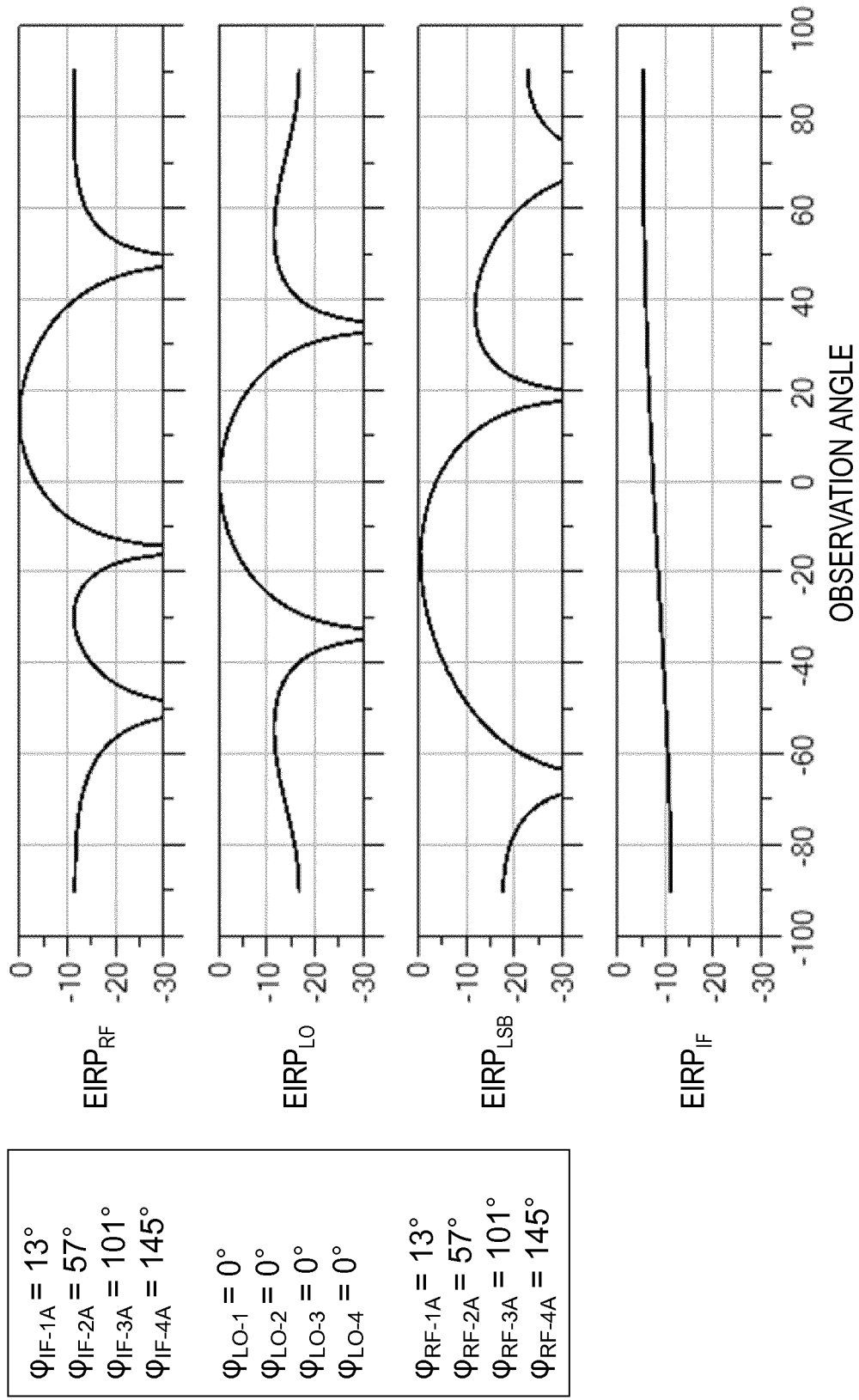
FIG. 4 shows an example of simulated antenna performance for a phased array transmitter as normalized EIRP for the RF, LO, LSB and IF frequencies as function of observation angle.
Figure 5:
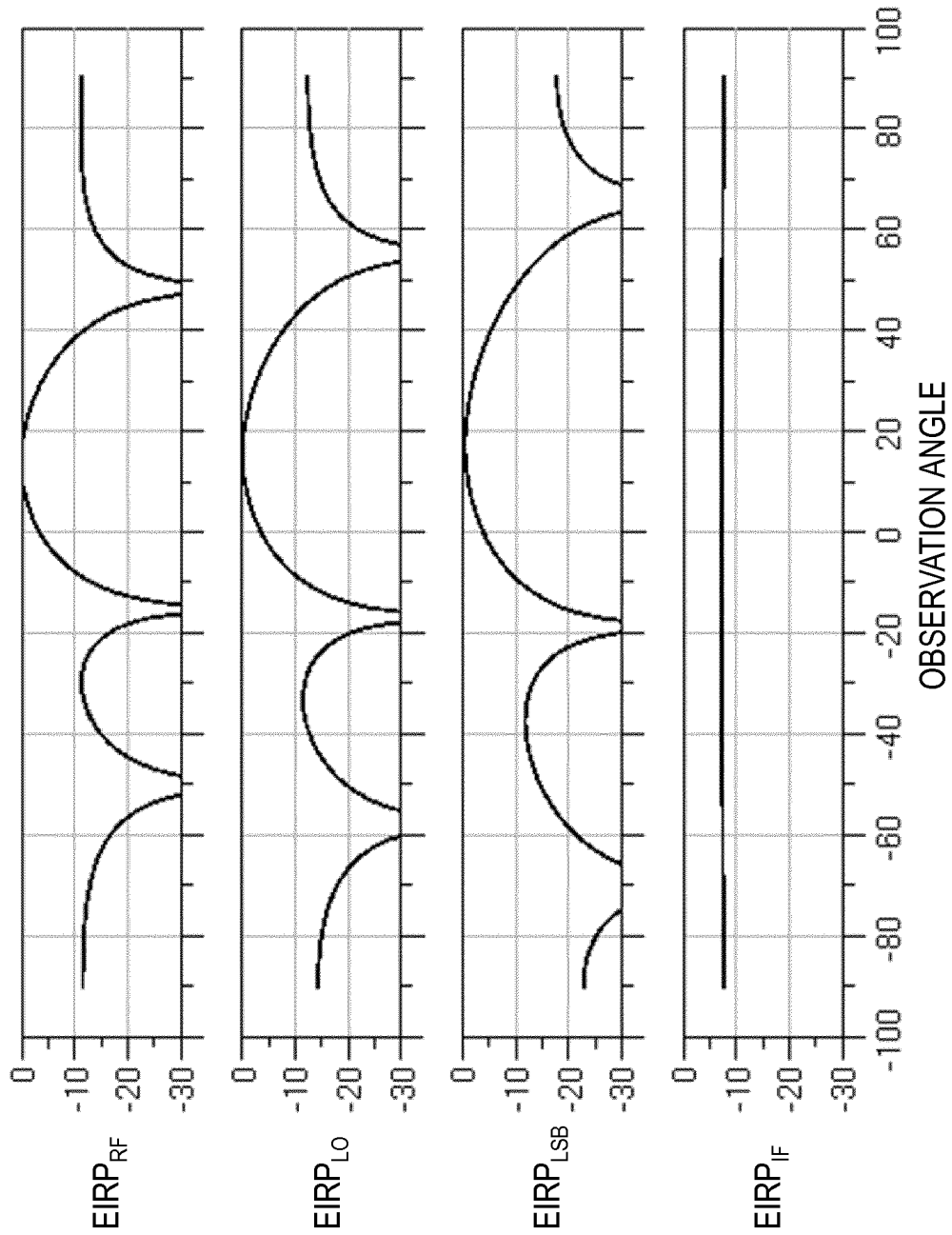
FIG. 5 shows an example of simulated antenna performance for a phased array transmitter as normalized EIRP for the RF, LO, LSB and IF frequencies as function of observation angle.
Figure 6:
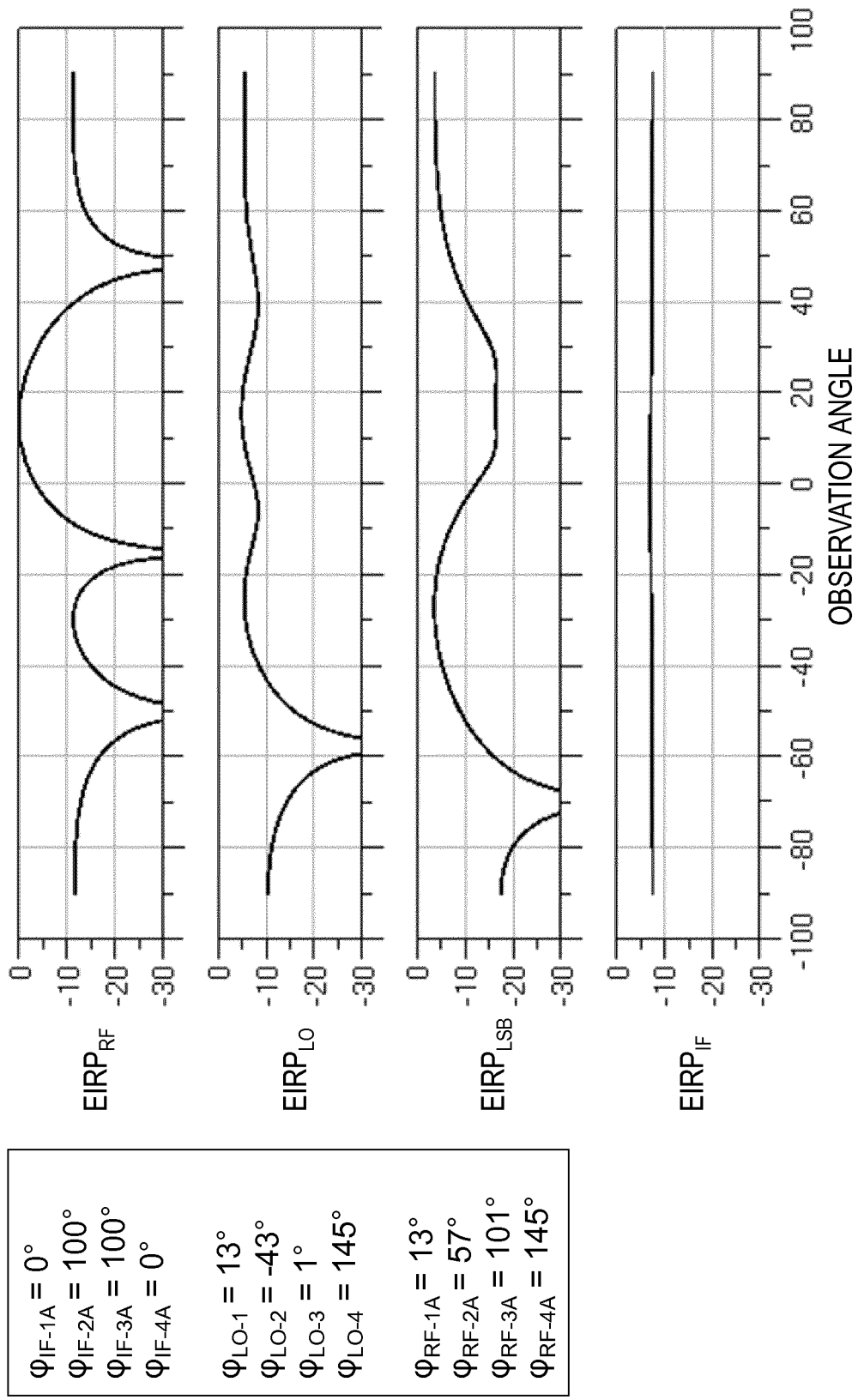
FIG. 6 shows an example of simulated antenna performance for a phased array transmitter as normalized EIRP for the RF, LO, LSB and IF frequencies as function of observation angle.

FIGS. 4-6 show simulated antenna patterns for an antenna array with four antenna elements and a desired beam pointing 14° upwards. The antenna diagrams show normalized effective isotropically radiated power, EIRP, as function of observation angle. Antenna patterns are shown for the four signals: RF, LO, LSB and IF. FIG. 4 shows simulated antenna patterns for a phased array transmitter 200 in which the phase shifts come entirely from the IF phase shifters 221-1A, 221-2A, 221-NA. The LO phase shifters 222-1, 222-2, 222-N are here all set to 0°. FIG. 5 shows simulated antenna patters for a phased array transmitter 200 in which the phase shifts come entirely from the LO phase shifters 222-1, 222-2, 222-N. The IF phase shifters 221-1A, 221-2A, 221-NA are in this case all set to 0°. FIG. 6 shows simulated antenna patters for a phased array transmitter 200 in which the phase shifts come from both IF phase shifters 221-1A, 221-2A, 221-NA and LO phase shifters 222-1, 222-2, 222-N.

The simulated antenna performances of FIGS. 4-6 illustrate that it is possible to control and reduce the antenna gain for unwanted spurious signals. The combined IF and LO phase shifts leaves the wanted RF signal unaffected, however, the unwanted spurious signals will change depending on the choice of the individual phase shifts. Hence, reducing interference from unwanted spurious signals is possible by choosing the IF and LO phase shifts wisely. It can be seen when one compare FIGS. 4 and 6 that the emitted peak power density at LO is 5 dB lower for the phased array transmitter of FIG. 6. This is equal to filter the unwanted emissions by the same amount that the antenna gain is reduced as far as an affected receiver is concerned. However, it does not consume any extra space in the phased array transmitter where space is critical.

Figure 2A:
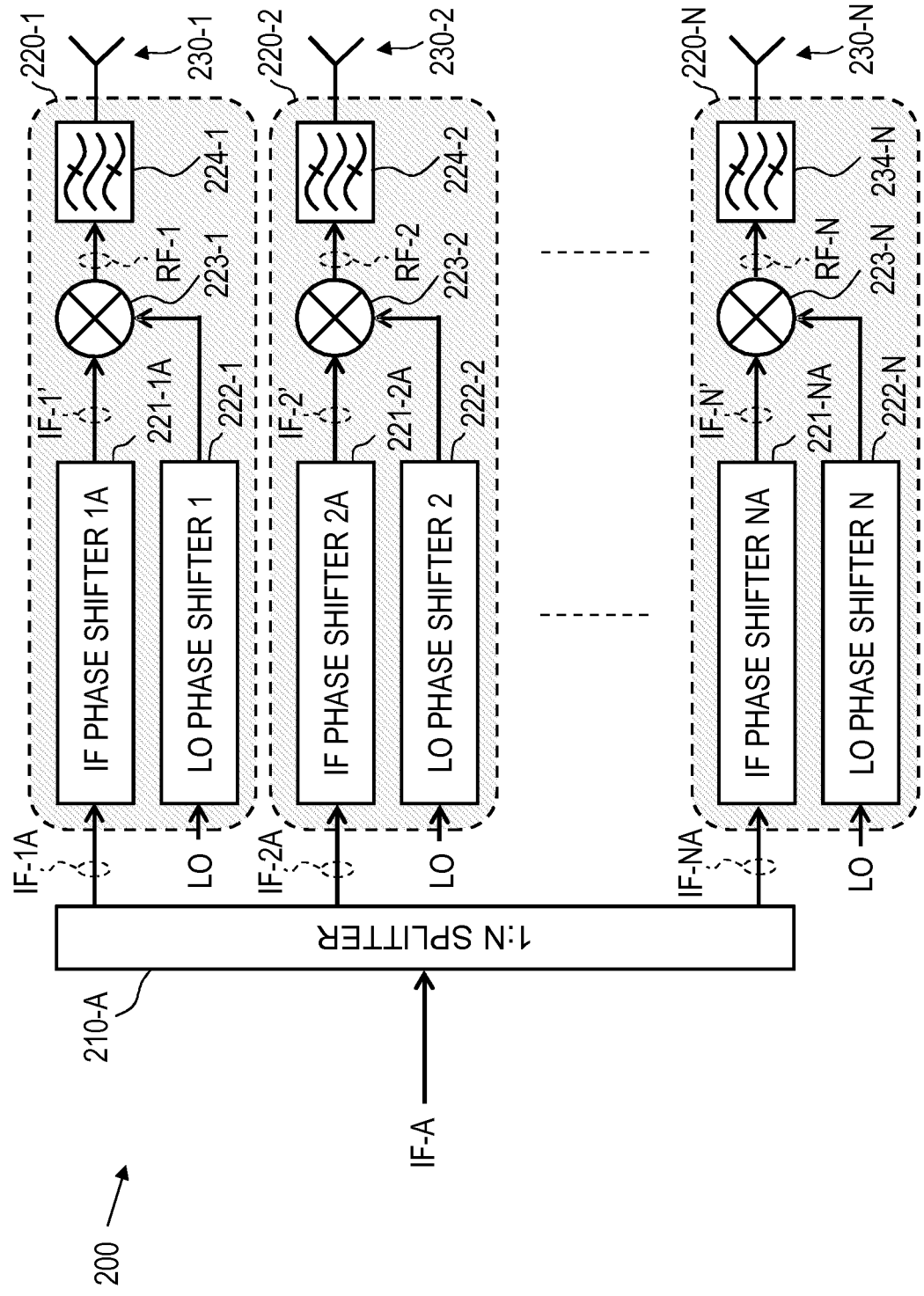
FIG. 2A shows schematically a phased array transmitter according to a first embodiment of the invention.
Figure 2B:
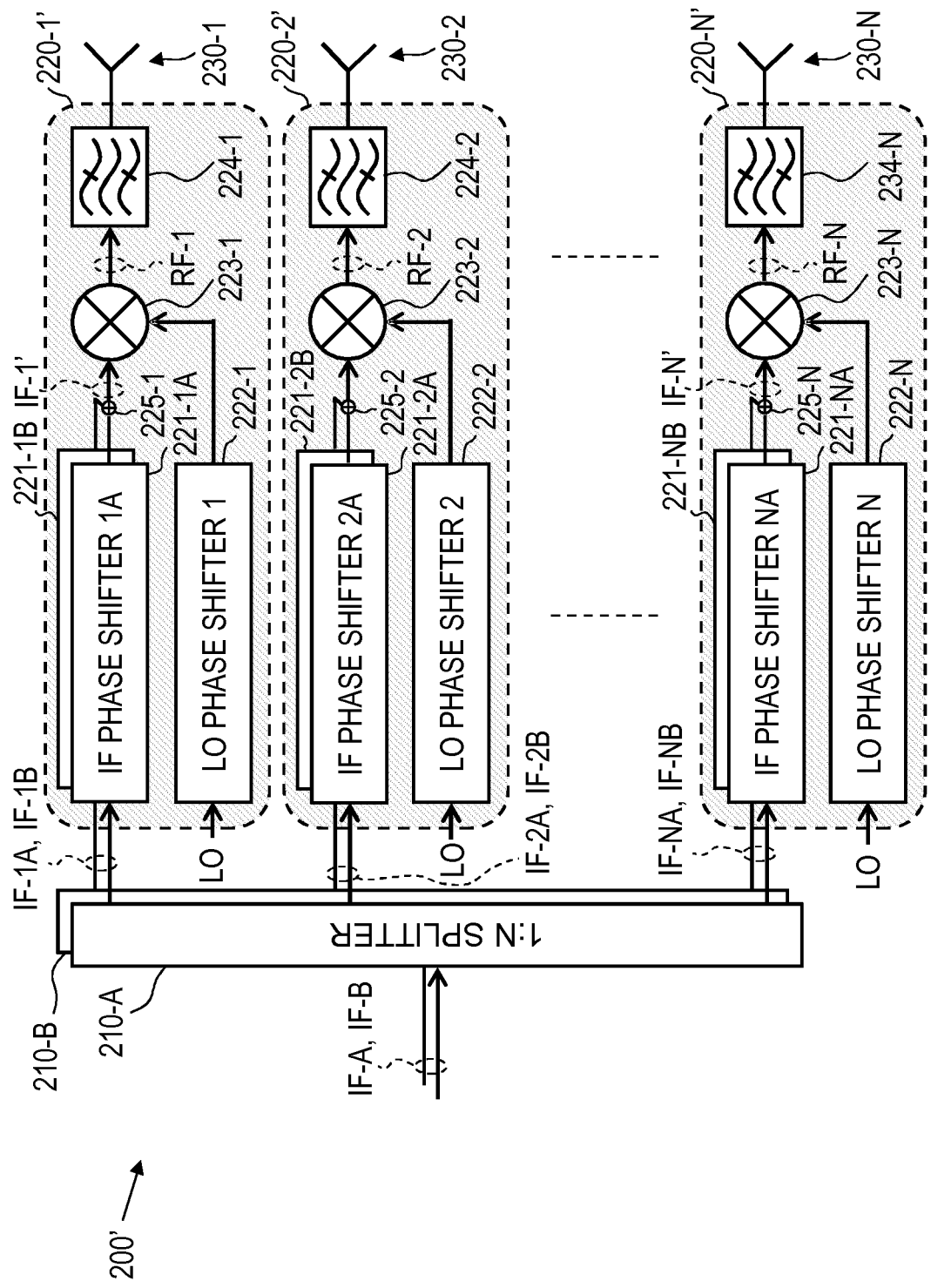
FIG. 2B shows schematically a phased array transmitter according to a second embodiment of the invention.

In the following, additional features of the second embodiment are described with reference to FIG. 2B. All features of the first embodiment are also comprised within the second embodiment.

The second embodiment relates to a phased array transmitter 200' for multi-channel beamforming that is configured for controlling and/or suppressing unwanted spurious signals. The phased array transmitter 200' further comprises a second IF splitter 210-B for splitting a second IF signal IF-B. The second IF splitter 210-B is configured for splitting an IF signal IF-B into a plurality of equal second input IF signals IF-1B, IF-2B, IF-NB. If the second IF signal is still in digital domain, this can be done by simply replicating the input to the plurality of outputs. If the second IF signal has already been converted to analog domain, the second IF splitter may be realized by a power divider that splits the incoming IF-B signal into N equal phase IF signals. The power divider may, in turn, be realized by a network of two-way power dividers in which the two outputs of one power divider is input to two other two-way power dividers. The outputs of the second IF splitter 210-B, i.e. the second input IF signals IF-1B, IF-2B, IF-NB, are fed to a plurality of transmitting branches 220-1', 220-2', 220-N'.

The transmitting branches 220-1', 220-2', 220-N' comprises the same features as the transmitting branches of the first embodiment. However, the transmitting branches 220-1', 220-2', 220-N' of the second embodiment are each further configured for up-converting one incoming second input IF signal IF-1B, IF-2B, IF-NB to an RF signal RF-1, RF-2, RF-N with a second desired RF phase shift $\varphi_{RF\text{-}1B}$, $\varphi_{RF\text{-}2B}$, $\varphi_{RF\text{-}NB}$. The desired phase shift of each transmitting branch is determined such that the phased array provides constructive interference in a second desired spatial direction. Here the second desired phase shift $\varphi_{RF\text{-}1B}$ is the phase shift of the first transmitting branch, $\varphi_{RF\text{-}2B}$ is the phase shift of the second transmitting branch, and so on.

Each transmitting branch 220-1', 220-2', 220-N' further comprises a second IF phase shifter 221-1B, 221-2B, 221-NB configured for phase shifting the second input IF signal with a second IF phase shift $\varphi_{IF\text{-}1B}$, $\varphi_{IF\text{-}2B}$, $\varphi_{IF\text{-}NB}$ to obtain a second phase shifted IF signal. Preferably, the second IF phase shifter provides a continuously variable phase shift. Alternatively, the second IF phase shifter provides a discrete set of phase shifts. The choice of the second IF phase shift $\varphi_{IF\text{-}1B}$, $\varphi_{IF\text{-}2B}$, $\varphi_{IF\text{-}NB}$ is determined such that the combined second IF phase shift and LO phase shift is the second desired RF phase shift TRF-1B, TRF-2B, TRF-NB of each transmitting branch.

Each transmitting branch 220-1', 220-2', 220-N' further comprises a combiner 225-1, 221-2, 225-N configured for adding the second phased shifted IF signal to the phase shifted IF signal IF-1', IF-2', IF-N' before mixing. If phased shifted IF signals are still in digital domain, this can be done by simply adding the IF signals together. If the phased shifted IF signals are in analog domain, this can be achieved by a combiner/adder circuit.

In the following, features of the third embodiment are described with reference to FIG. 3.

The third embodiment relates to a method for beamforming in a phased array transmitter 200. The method comprises the steps of splitting 300, phase-shifting 310, up-converting 320 and transmitting 330.

The step of splitting 300 comprises splitting an IF signal IF-A into a plurality of input IF signals IF-1A, IF-2A, IF-NA and passing on each of the plurality of input IF signals to a corresponding transmitting branch 220-1, 220-2, 220-N. If the IF signal is still in digital domain, the splitting may be performed by simply replicating the input to the N outputs the splitter 210-A. If the IF signal is already converted to analog domain, the splitting may be performed by a power divider that splits the incoming IF signal into N equal phase output IF signals.

The step of phase shifting 310 comprises, for each transmitting branch, phase-shifting to obtain a desired phase shift of the RF signal. The desired phase shift of each transmitting branch is determined such that the phased array provides constructive interference for the RF signal in a desired spatial direction. The phase shifting 310 is achieved by phase-shifting the input IF signal IF-1A, IF-2A, IF-NA, for each transmitting branch, with an IF phase shift $\varphi_{IF-1A}$, $\varphi_{IF-2A}$, $\varphi_{IF-NA}$ to obtain a phase shifted IF signal IF-1', IF-2', IF-N', and phase-shifting the LO signal, for each transmitting branch, with an LO phase shift $\varphi_{LO-1}$, $\varphi_{LO-2}$, $\varphi_{LO-N}$ to obtain a phase shifted LO signal. The choice of IF phase shift $\varphi_{IF-1A}$, $\varphi_{IF-2A}$, $\varphi_{IF-NA}$ and LO phase shift $\varphi_{LO-1}$, $\varphi_{LO-2}$, $\varphi_{LO-N}$ is determined such that the combined IF and LO phase shift is the desired RF phase shift $\varphi_{RF-1A}$, $\varphi_{RF-2A}$, $\varphi_{RF-NA}$ of each transmitting branch. Note here that if the wanted RF signal is LO+IF, the combined IF and LO phase shift is derived as $\varphi_{RF}=\varphi_{LO}+\varphi_{IF}$. However, if the wanted RF signal instead is LO-IF, the combined IF and LO phase shift will instead be derived as $\varphi_{RF}=\varphi_{LO}-\varphi_{IF}$.

The phase shifting is achieved by the use of an IF phase shifter 221-1A, 221-2A, 221-NA and an LO phase shifter 222-1, 222-2, 222-N. At least one of the IF phase shifter and the LO phase shifter in each transmitting branch must be tunable. Preferably, the IF phase shifter provides continuously variable phase shifts. The IF phase shifter may alternatively provide a discrete set of phase shifts. Likewise, the LO phase shifter preferably provides continuously variable phase. The LO phase shifter may alternatively provide a discrete set of phase shifts or a fixed phase shift.

The step of up-converting 320 comprises, for each transmitting branch, mixing the phase shifted IF signal IF-1', IF-2', IF-N' with the phase shifted LO signal to obtain the RF signal RF-1, RF-2, RF-N as output. The mixing is performed after phase-shifting of the IF and LO signals. The mixing is performed by a mixer 223-1, 223-2, 223-N. Apart from the wanted RF signal at LO+IF, the output of the mixer also comprises unwanted spurious signals at any frequency n*IF+m*LO where n and m are any integers not equal to one. The spurious signals of largest concern will be LO and LO-IF. If the wanted RF signal is LO-IF, the spurious signals of largest concern will be LO and LO+IF. Note that higher order harmonics are usually weaker and of less concern.

The step of transmitting 330 comprises, for each transmitting branch, transmitting the RF signal with the desired RF phase shift, by feeding the RF signal to an antenna element 230-1, 230-2, 230-N.

In another aspect of the third embodiment, the step of phase shifting 310 involves for each transmitting branch determining the IF phase shift $\varphi_{IF-1A}$, $\varphi_{IF-2A}$, $\varphi_{IF-NA}$ and LO phase shift $\varphi_{LO-1}$, $\varphi_{LO-2}$, $\varphi_{LO-N}$ for controlling and/or suppressing the phase shifts of the unwanted spurious signals. This is possible because the constraints on the combined IF and LO phase shifts provides a plurality of choices for the individual IF and LO phase shifts. Suppression of the unwanted spurious signals can be achieved by having an omnidirectional beam pattern for the unwanted spurious signals. One way to achieve an omnidirectional beam pattern is to let either the IF phase shift or the LO phase shift be chosen randomly. Another way is to have a spherical wavefront for the LO beam. Preferably, the LO phase shifts $\varphi_{LO-1}$, $\varphi_{LO-2}$, $\varphi_{LO-N}$ are chosen randomly in order to suppress unwanted spurious signals.

In another aspect of the third embodiment, the method is further comprising the step of filtering the RF signal with a band-pass filter configured for suppressing unwanted spurious frequency components.

In another aspect of the third embodiment, the method further comprises the step of amplifying the RF signal before transmitting 330.

The features of the third embodiment are also comprised within the fourth embodiment. In the following, additional features of the fourth embodiment are described with reference to FIG. 3.

According to the fourth embodiment, the step of splitting 300 is further comprising splitting a second IF signal IF-B into a plurality of second input IF signals IF-1B, IF-2B, IF-NB and feeding each of the plurality of second input IF signals to a corresponding transmitting branch 220-1', 220-2', 220-N'. If the IF signal is still in digital domain, the splitting may be performed by simply replicating the input to the N outputs the splitter 210-B. If the IF signal is already converted to analog domain, the splitting may be performed by a power divider that splits the incoming IF signal into N equal phase output IF signals.

According to the fourth embodiment, the step of phase-shifting 310, for each transmitting branch, is further comprising phase-shifting the second input IF signal IF-1, IF-2, IF-N with a second IF phase shift $\varphi_{IF-1B}$, $\varphi_{IF-2B}$, $\varphi_{IF-NB}$ to obtain a second phase shifted IF signal. The second phase shifted IF signal is then added to added to the phase shifted IF signal IF-1', IF-2', IF-N'. The choice of the second IF phase shift is determined such that the combined IF and LO phase shift of each transmitting branch is a second desired RF phase shift $\varphi_{RF-1B}$, $\varphi_{RF-2B}$, $\varphi_{RF-NB}$.

In the following, additional implementation aspects of the four embodiments are discussed.

In one aspect of the invention, the IF signals IF-A, IF-B may be zero-IF signals, i.e. baseband signals. The splitters 210-A, 210-B and the IF phase shifters 221-1A, 221-1B, 221-2A, 221-2B, 221-NA, 221-NB will then operate on zero-IF signals. The up-converting mixer 223-1, 223-2. 223-N may convert the zero-IF signal directly to RF or comprise an additional mixer that first converts the phase shifted zero-IF signal IF-1', IF-2', IF-N' to an IF frequency before mixing with the phase-shifted LO signal to obtain the RF signal RF-1, RF-2, RF-N.

In another aspect of the invention, all signals preceding the mixer 223-1, 223-2. 223-N may be in digital domain. The digital domain phase shifted IF signals IF-1', IF-2', IF-N' are converted to analog domain by a digital-to-analog converter before mixing with the phase-shifted LO signal. The step of splitting 300, performed by the splitters 210-A, 210-B, and the step of phase-shifting, performed by the IF phase shifters 221-1A, 221-1B, 221-2A, 221-2B, 221-NA, 221-NB, may be implemented using any combination of one or more of a suitable central processing unit, multiprocessor, microcontroller, digital signal processor, application specific integrated circuit, field programmable gate arrays etc., capable of executing software instructions stored in a computer program product, e.g. in the form of a storage medium. The storage medium may comprise persistent storage, which, for example, can be any single one or combination of magnetic memory, optical memory, solid state memory or even remotely mounted memory.

In yet another aspect of the invention, the IF phase shifters 221-1A, 221-1B, 221-2A, 221-2B, 221-NA, 221-NB may further be configured to control the amplitude of the input IF signals, e.g. by multiplying each input IF signal with a weight.

In yet another aspect of the invention, the phased array transmitter 200, 200' may be an active electronically scanned array, AESA.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The invention claimed is:

1. A phased array transmitter comprising:
a first splitter configured to split a first intermediate frequency (IF) signal into a plurality of first input IF signals;
a plurality of transmitting branches each configured to up-convert a respective one of the plurality of input IF signals to a respective radio frequency (RF) signal with a desired phase shift, wherein each transmitting branch is connected to an antenna element configured to transmit the respective RF signal;
wherein each transmitting branch of the plurality of transmitting branches comprises an IF phase shifter configured to phase shift the first input IF signal with a first IF phase shift to obtain a first phase shifted IF signal, a local oscillator (LO) phase shifter configured to phase shift an LO signal with an LO phase shift to obtain a phase shifted LO signal, a mixer configured to mix the first phase shifted IF signal with the phased shifted LO signal to obtain the RF signal, wherein the combined IF phase shift and LO phase shift is the desired RF phase shift of each transmitting branch;
a second splitter configured to split a second IF signal into a plurality of second input IF signals; wherein each transmitting branch is further configured to up-convert a second input IF signal to an RF signal with a second desired phase shift and wherein each transmitting branch is further comprising a second IF phase shifter configured to phase shift the second IF signal with a second IF phase shift to obtain a second phase shifted IF signal, wherein the combined second IF phase shift and LO phase shift is the second desired RF phase shift of each transmitting branch;
a combiner configured to add the second phased shifted IF signal to the phase shifted IF signal before mixing with the phase shifted LO signal; and
wherein the mixer is further configured to mix the combined phase shifted IF signal with the phased shifted LO signal to obtain the RF signal.

2. The phased array transmitter according to claim 1, wherein each transmitting branch is further comprising a band-pass filter configured to suppress unwanted spurious signals.

3. The phased array transmitter according to claim 1, wherein each transmitting branch is further comprising a power amplifier configured to amplify the RF signal.

4. The phased array transmitter according to claim 1, wherein at least one of the first and second IF phase shifters in each transmitting branch is tunable.

5. The phased array transmitter according to claim 1, wherein the first and second IF phase shifter of each transmitting branch is configured to provide a continuously variable phase shift; and
wherein the LO phase shifter of each transmitting branch is configured to provide a continuously variable phase shift.

6. The phased array transmitter according to claim 1, wherein the first and second IF phase shifter of each transmitting branch is configured to provide a discrete set of variable phase shifts; and
wherein the LO phase shifter of each transmitting branch is configured to provide a discrete set of variable phase shifts.

7. The phased array transmitter according to claim 1, wherein each of the first and second phase shifted IF signals comprises a digital domain phase shifted IF signal;
wherein each transmit branch is further configured to convert the digital domain phase shifted IF signal to the analog domain; and
wherein the mixer is configured to mix the analog domain phase shifted IF signal with the phased shifted LO signal to obtain the RF signal.

8. The phased array transmitter according to claim 1, wherein for each transmitting branch the LO phase shifts are chosen randomly in order to suppress unwanted spurious signals.

9. A method for beamforming in a phased array transmitter, the method comprising:
splitting a first intermediate frequency (IF) signal into a plurality of first input IF signals and feeding each of the plurality of first input IF signals to a corresponding transmitting branch;
phase-shifting, for each transmitting branch, the first input IF signal with a first IF phase shift to obtain a first phase shifted IF signal, and phase-shifting a local oscillator (LO) signal with an LO phase shift to obtain a phase shifted LO signal, wherein the choice of the first IF phase shift and the LO phase shift is determined such that the combined IF and LO phase shift is the desired RF phase shift of each transmitting branch;
up-converting, for each transmitting branch, the first input IF signal to a radio frequency (RF) signal with a desired RF phase shift by mixing the first phase shifted IF signal and the phased shifted LO signal to obtain the RF signal with the desired RF phase shift; and
transmitting, for each transmitting branch, the RF signal by feeding the RF signal to an antenna element;
wherein splitting further comprises splitting a second IF signal into a plurality of second input IF signals and feeding each of the plurality of second input IF signals to a corresponding transmitting branch;
wherein phase-shifting, for each transmitting branch, further comprises phase-shifting the second input IF signal with a second IF phase shift to obtain a second phase shifted IF signal that is added to the phase shifted IF signal to obtain a combined phase shifted IF signal, wherein the choice of the second IF phase shift is determined such that the combined IF and LO phase shift of each transmitting branch is a second desired RF phase shift; and
wherein up-converting, for each transmitting branch, comprises mixing the combined phase shifted IF signal and the phased shifted LO signal to obtain the RF signal with the desired RF phase shift.

10. The method in accordance with claim 9, wherein the method further comprises:
filtering the RF signal with a band-pass filter configured to suppress unwanted spurious frequency components.

11. The method in accordance with claim 9, wherein the method further comprises:
amplifying the RF signal before transmitting.

12. The method in accordance with claim 9, wherein at least one of the first and second IF phase shifter and the LO phase shifter in each transmitting branch is tunable.

13. The method according to claim 9, wherein the first and second IF phase shift comprises a continuously variable phase shift; and
wherein the LO phase shift comprises a continuously variable phase shift.

14. The method according to claim 9, wherein the first and second IF phase shift comprises a discrete set of variable phase shifts; and
wherein the LO phase shift comprises a discrete set of variable phase shifts.

15. The method according to claim 9, wherein each first and second phase shifted IF signal comprises a digital domain phase shifted IF signal;
wherein phase-shifting, for each transmitting branch, further comprises converting the digital domain phase shifted IF signal to the analog domain; and
wherein up-converting, for each transmitting branch, further comprises mixing the analog domain phase shifted IF signal with the phased shifted LO signal to obtain the RF signal.

16. The method according to claim 9, wherein for each transmitting branch the LO phase shifts are chosen randomly in order to suppress unwanted spurious signals.

17. A computer readable program product comprised on a non-transitory computer-readable medium, the computer readable program product comprising executable instructions that when executed by a processor of a phased array transmitter causes the processor to operate to:
split a first intermediate frequency (IF) signal into a plurality of first input IF signals and feeding each of the plurality of first input IF signals to a corresponding transmitting branch of the phased array transmitter;
phase-shift for each transmitting branch, the first input IF signal with a first IF phase shift to obtain a first phase shifted IF signal, and phase-shifting the a local oscillator (LO) signal with an LO phase shift to obtain a phase shifted LO signal, wherein the choice of the first IF phase shift and the LO phase shift is determined such that the combined IF and LO phase shift is the desired RF phase shift of each transmitting branch;
up-convert, for each transmitting branch, the first input IF signal to a radio frequency (RF) signal with a desired RF phase shift by mixing the first phase shifted IF signal and the phased shifted LO signal to obtain the RF signal with the desired RF phase shift; and
transmit, for each transmitting branch, the RF signal by feeding the RF signal to an antenna element;
split a second IF signal into a plurality of second input IF signals and feeding each of the plurality of second input IF signals to a corresponding transmitting branch;
for each transmitting branch, phase-shift the second input IF signal with a second IF phase shift to obtain a second phase shifted IF signal that is added to the phase shifted IF signal to obtain a combined phase shifted IF signal, wherein the choice of the second IF phase shift is determined such that the combined IF and LO phase shift of each transmitting branch is a second desired RF phase shift; and
mix the combined phase shifted IF signal and the phased shifted LO signal to obtain the RF signal with the desired RF phase shift.

18. The computer readable program product according to claim 17, wherein for each transmitting branch the LO phase shifts are chosen randomly in order to suppress unwanted spurious signals.

* * * * *